United States Patent
Hao et al.

(10) Patent No.: US 9,224,223 B2
(45) Date of Patent: Dec. 29, 2015

(54) VISUAL ANALYTICS USING MULTIVARIATE CONCENTRIC RINGS WITH A VISUAL START TIME MECHANISM

(71) Applicant: HEWLETT-PACKARD DEVELOPMENT COMPANY, L.P., Houston, TX (US)

(72) Inventors: Ming C. Hao, Palo Alto, CA (US); Manish Marwah, Palo Alto, CA (US); Michael Hund, Baienfurt (DE); Sebastian Mittelstaedt, Constance (DE); Umeshwar Dayal, Saratoga, CA (US); Meichun Hsu, Los Altos Hills, CA (US); Cullen E. Bash, Los Gatos, CA (US); Daniel Keim, Constance (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 216 days.

(21) Appl. No.: 13/871,924

(22) Filed: Apr. 26, 2013

(65) Prior Publication Data

US 2014/0325417 A1 Oct. 30, 2014

(51) Int. Cl.
*G06T 11/20* (2006.01)
*G06F 3/0484* (2013.01)

(52) U.S. Cl.
CPC ............ *G06T 11/206* (2013.01); *G06F 3/0484* (2013.01)

(58) Field of Classification Search
CPC ... G06T 11/206; G06F 8/10; G06F 17/30436; G06F 17/30448
USPC ........... 715/771–772, 215; 345/440–443, 420
See application file for complete search history.

(56) References Cited

U.S. PATENT DOCUMENTS

| | | | |
|---|---|---|---|
| 2002/0054117 A1* | 5/2002 | van Dantzich et al. | 345/766 |
| 2008/0208027 A1* | 8/2008 | Heaton | 600/365 |
| 2010/0095235 A1* | 4/2010 | Bennett et al. | 715/781 |
| 2012/0102396 A1 | 4/2012 | Arksey et al. | |
| 2012/0200567 A1 | 8/2012 | Mandel et al. | |
| 2013/0127911 A1* | 5/2013 | Brown | 345/649 |

OTHER PUBLICATIONS

Behrisch, M. et al; "Matrix-based Visual Correlation Analysis on Large Time Series Data"; Oct. 14-19, 2012.
Carlis, J.V. et al.; "Interactive Visualization of Serial Perodic Data"; 1998.
Keim, D.A. et al.; "Circle View—A New Approach for Visualizing Time-related Multidimensional Data Sets"; May 25-28, 2004.
Kosara, R.; "Spirals of Periodic Data"; Aug. 7, 2011.
Shrinivasan, Y.B.; "Visualisation of Spatio-temporal Patterns in Public Transport Data"; Mar. 2005.

* cited by examiner

*Primary Examiner* — Amy Ng
*Assistant Examiner* — Roland Casillas
(74) *Attorney, Agent, or Firm* — Mannava & Kang, P.C.

(57) ABSTRACT

Visual analytics using multivariate concentric rings with a visual start time mechanism includes displaying an interactive graph where the interactive graph has multiple concentric rings that have multiple cells that represent sequential time periods. The concentric rings form a time unit that starts at an origin and ends at a time unit end and also has a pre-nonorigin starting section and a post-nonorigin starting section. A color is displayed in the cells to represent measurements associated with time stamps corresponding to cells in the post-nonorigin starting section. Further, a background color is displayed in cells of the pre-nonorigin starting section. The cells in the pre-nonorigin starting section are reused by displaying a color to represent metrics associated with time stamps belonging to a subsequent time unit.

15 Claims, 4 Drawing Sheets
(2 of 4 Drawing Sheet(s) Filed in Color)

| 402 | Display an interactive graph in a display where the interactive graph includes multiple concentric rings that have multiple cells that represent sequential time periods where the concentric rings form a time unit that starts at an origin and ends at a time unit end and where the multiple concentric rings have a pre-nonorigin starting section and a post-nonorigin starting section |

| 404 | Displaying at least one metric color in the multiple cells that represent measurements associated with time stamps corresponding to the cells in the post-nonorigin starting section and displaying a background color in the cells of the pre-nonorigin starting section |

| 406 | Reuse the cells in the pre-nonorigin starting section to display the at least one metric color to represent metrics associated with other time stamps that belong to a subsequent time unit |

| 408 | Display a gap of the background color between the reused cells in the pre-nonorigin starting section and the nonorigin start time |

*Fig. 4*

| 500 | Display System |
|---|---|
| 502 | Ring Displaying Engine |
| 504 | Color Displaying Engine |
| 506 | Start Time Engine |
| 508 | Animation Engine |
| 510 | Replay Engine |
| 512 | Drill Down Engine |

VISUAL ANALYTICS USING MULTIVARIATE CONCENTRIC RINGS WITH A VISUAL START TIME MECHANISM

BACKGROUND

Visual analytics is a field of data presentation that allows a user to view multiple dimensions of data together in a way that relates the different dimensions together in an easy to understand manner. For example, a graph that relates temperatures measured at specific times to humidity measured at the same time is a simple example relating multiple types of data to each other in an intuitive manner that a user can easily understand. However, the field of visual analytics also includes presenting more complicated data sets to a user to analyze visually.

BRIEF DESCRIPTION OF THE DRAWINGS

The application file contains at least one drawing executed in color. Copies of this patent application publication with color drawings will be provided by the Office upon request and payment of the necessary fee.

The accompanying drawings illustrate various examples of the principles described herein and are a part of the specification. The illustrated examples are merely examples and do not limit the scope of the claims.

DETAILED DESCRIPTION

The principles described herein include using multiple concentric rings to relate different types of information to each other in an interactive graph so that all time periods across different concentric rings are aligned. Each of the concentric rings is divided into cells that represent sequential time periods within a larger time unit, and a color of the cells represents a value of a metric measured at the respective time period. However, not all of the metrics start being measured at the same time. Thus, the principles described herein include a mechanism for intuitively helping a user to recognize the start times in the interactive graphs.

The mechanism for recognizing the start times can include displaying a background color of the interactive graph in those cells that are missing data. Cells that are missing data include the cells that represent time periods that occur before the start time of the measurements. However, these cells can be reused to represent data in subsequent time units. For example, the concentric rings may represent an original time unit, such as a twenty four hour period starting at an origin of 0:00 a.m. and ending at 11:59 p.m. of the original time unit. The measurement start time, when measurements are started, may occur after the 0:00 a.m., such as 6:00 a.m. In such an example, the cells from 0:00 a.m. to 5:59 a.m. of the original time unit will initially display a background color because they will be missing data. The cells that represent time periods that occur after the measurement start time, which includes cells from 6:00 a.m. to 11:59 p.m. of the original time unit will display the color associated with the appropriate metric values. However, the measurements can be continued to be measured into subsequent time units, such as the following day. The cells that are chronologically arranged between the origin of the time unit and the nonorigin starting time may be reused to display the colors that are associated with metrics in the subsequent time unit. The background color may form a gap between the cells that represent metrics measured in the subsequent time units and the nonorigin starting time to visually indicate to the user the location of the measurement start time in the interactive graph.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
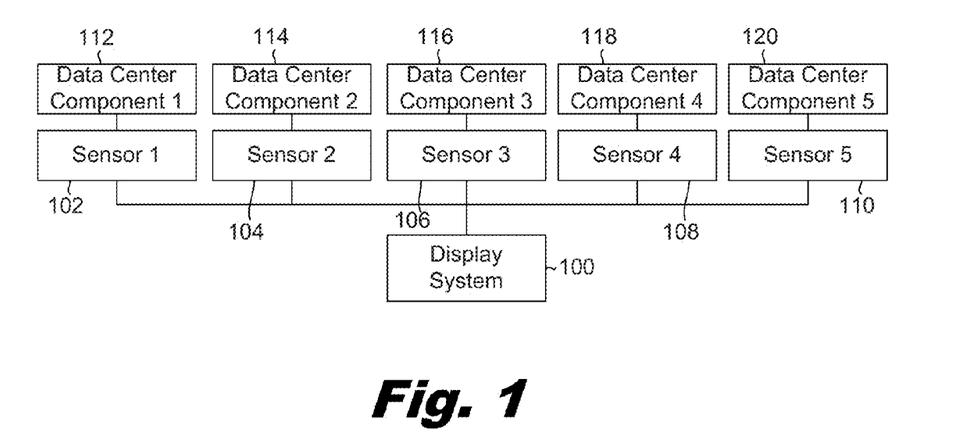
FIG. 1 is a diagram of an example of sensors in communication with a display system according to the principles described herein.

FIG. 1 is a diagram of an example of sensors in communication with a display system (100) according to the principles described herein. In this example, multiple sensors (102, 104, 106, 108, 110) are in communication with multiple data center components (112, 114, 116, 118, 120). The sensors (102, 104, 106, 108, 110) may measure at least one metric that pertains to the data center components (112, 114, 116, 118, 120). For example, the metrics may include values pertaining to temperature, bandwidth, error rate, failure rate, congestion, energy consumption, other metrics, or combinations thereof.

The sensors (102, 104, 106, 108, 110) may send their recorded measurements to the display system (100). The display system (100) has a display and an ability to present the metrics measured with the sensors (102, 104, 106, 108, 110) in the display. In some examples, a single metric measured against time is displayed in the display with multiple concentric rings. Each of the concentric rings may be divided into cells that represent time periods. The color of the cells represents the values of the metrics at the appropriate time periods. The display system (100) may include a mechanism to visually depict to the user the start time of when the measurements began. In some cases, the cells that represent time periods before the start time of the metrics will display a background color to intuitively communicate to the user that measurements were not yet taken at these times. The background color may be the color of the background of the interactive graph. For example, if the concentric rings are displayed on a black background, then the background color is black. In some examples, the background of the interactive graph may include a pattern or multiple colors. In such an example, the cells that represent time periods prior to the start time are displayed in a manner that makes the cells appear to be consistent with the background.

Figure 2:
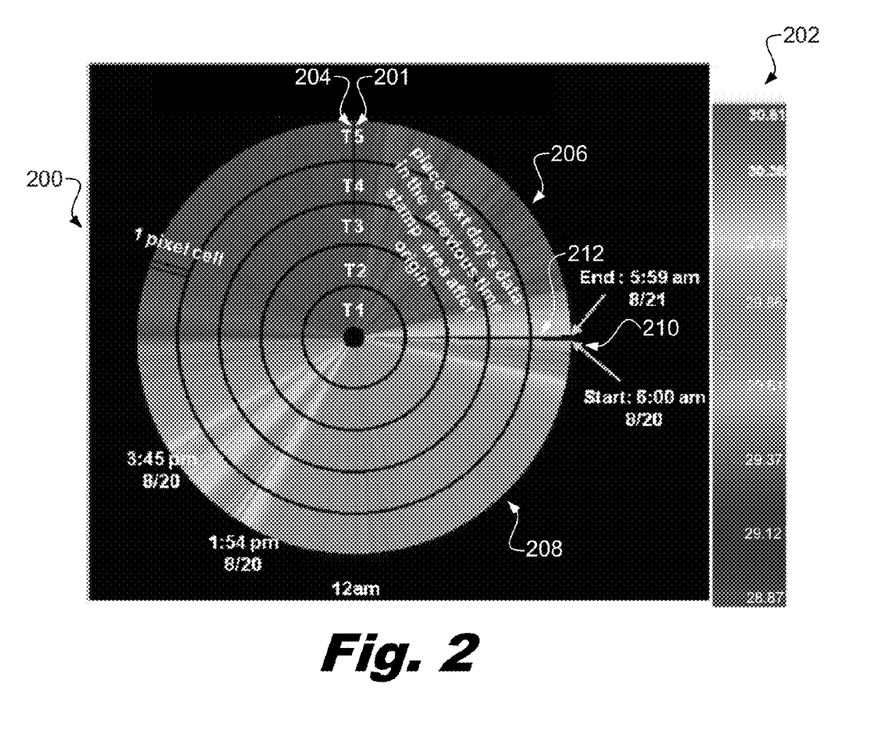
FIG. 2 is a diagram of an example of an interactive graph according to the principles described herein.

The concentric rings may represent larger time units than the time periods represented by the cells of the concentric rings. In other examples, the concentric rings represent a specific sensor. While these examples have been described with reference to specific items that may be represented with the concentric rings, any appropriate item may be represented with the concentric rings according to the principles described herein. FIG. 2 is a diagram of an example of an interactive graph (200) according to the principles described herein. In this example, the interactive graph (200) includes five concentric rings (T1, T2, T3, T4, T5). Each of the concentric rings represents a sensor used to measure a component of a data center. Each of the concentric rings (T1, T2, T3, T4, T5) are divided into cells that represent sequential time periods that form a time unit. The time periods may be any appropriate time period, such as time periods in the order of seconds, minutes, hours, days, weeks, months, years, other time periods, or combinations thereof. The time unit starts at an origin (201) and ends at a time unit end (204).

The concentric cells also include a pre-nonorigin starting section (206) and a post-nonorigin starting section (208) that are separated by a nonorigin starting time (210). The nonorigin start time (210) is a time where measurements are started to be taken that is after the origin (201) of the time units. The pre-nonorigin starting section (206) contains those cells that are chronologically between the origin (201) and the nonorigin start time (210). Also, the post-nonorigin starting section (208) contains those cells that are chronologically between the nonorigin start time (210) and the time unit end (204).

The colors of the cells represent the value of the metric measured at the respective time periods. A color map (202) to the side of the interactive graph (200) associates the value of the metric to the displayed colors. In the example of FIG. 2, the metric is a temperature metric for just one of the data center components. A red color represents a high temperature value while a purple color represents a low temperature value. The colors in between the red and purple colors represent a progressive change in the metric's values. For example, the color map represents a continuum that goes from purple to blue to green to yellow to orange to red to represent a progressive change from low to high power consumption. While this example has been described with reference to a specific color map, any appropriate color map may be used in accordance with the principles described herein. For example, different colors may be used in the color map, or the colors may be used in a different order. Further, other color maps may include just two colors and a transition between the colors. In yet other examples, the color map uses a single color and alters the brightness of that color to represent a change in the metric's value.

In the example of FIG. 2, the sensor metric is a temperature of a component of the data center. A red color represents 30.61 degrees Celsius and a blue color represents a 28.87 degrees Celsius. The colors between the red color and the blue color represent the temperatures between 30.61 degrees Celsius and 28.87 degrees Celsius.

The time periods of the concentric rings (T1, T2, T3, T4, T5) are aligned such that the cells that represent 1:54 p.m. on August 20$^{th}$ are along a radial line across the concentric rings (T1, T2, T3, T4, T5). In this manner, the measurements of each of the sensors can be compared to each other at different time periods. For example, at 1:54 p.m. on August 20$^{th}$ the cells display a yellow color while the time periods that precede and follow 1:54 p.m. on August 20$^{th}$ are green. Such a change in color is an indication that some occurrence at 1:54 p.m. on August 20$^{th}$ affected all of the sensors' readings. Likewise, another occurrence that affected all of the sensor's readings occurred at 3:45 p.m. on August 20$^{th}$. These color changes may indicate to a user that there is an anomaly that may be investigated.

The cells in the pre-nonorigin starting section (206) can be reused to represent measurements that were taken after the time of the time unit end (204). In the example of FIG. 2, measurements were taken at least until 5:59 a.m. on August 21$^{st}$, which crosses the time unit end (204). The measurements taken from 0:00 a.m. on August 21$^{st}$ to 5:59 a.m. on August 21$^{st}$ belong to a subsequent time unit. However, the cells in the pre-nonorigin starting section (206) can be caused to display metric colors to represent the time periods of the subsequent time unit.

The start time for the recorded data was 6:00 p.m. on August 20$^{th}$ and the end time was 5:59 a.m. on August 21$^{st}$. To make the start time stand out, a gap (212) of the background color is formed in the concentric rings (T1, T2, T3, T4, T5) that is positioned between the reused cells in the pre-nonorigin starting section (206) and the nonorigin starting time (210). This start time mechanism visually indicates to a user in an intuitive manner where the start time of the measurements occurred.

An additional set of multiple concentric rings may be displayed to depict the metrics of the subsequent time unit. In alternative examples, the user has an option to display the other sets of concentric rings designated for other time units.

In an example, the following table represents the measurement taken with the sensors representing the concentric rings (T1, T2, T3, T4, T5). Each measurement is recorded with a timestamp.

| Variable T1 | ... | Variable T5 | Timestamp |
|---|---|---|---|
| 61 | ... | 60 | 8/20/2012 06:00 |
| 62 | ... | 61 | 8/20/2012 06:01 |
| 62 | ... | 59 | 8/20/2012 06:02 |
| 62 | ... | 72 | 8/20/2012 06:03 |
| ... | ... | ... | ... |
| 63 | ... | 60 | 8/20/2012 23:58 |
| 61 | ... | 60 | 8/20/2012 23:59 |
| 62 | ... | 52 | 8/21/2012 00:00 |
| 61 | ... | 51 | 8/21/2012 00:01 |
| 64 | ... | 56 | 8/21/2012 00:02 |
| ... | ... | ... | ... |
| 64 | ... | 61 | 8/21/2012 05:58 |
| 61 | ... | 61 | 8/21/2012 05:59 |

In this example, the start time is 6:00 a.m. on Aug. 20, 2012 and the table includes data up to 5:59 a.m. Aug. 21, 2012. Thus, some of the data belongs to a time unit of the first day, August 20$^{th}$, while other data belongs to a subsequent time unit of the second day, August 21$^{st}$. The display system may use the following code to determine where to place the recorded data in the interactive graph:

```
--------------------------------
Code: Inter Change Timestamp (place the data greater than one period
(i.e.,
24 hours, one week, one month) to the beginning of the period (origin,
0:00)
--------------------------------
---------
INPUT:
---------
// the number of days which represents one ring dateRangeOnePeriod
// the data rows, containing each a timestamp (timestamp_row$_i$) and
// the values for each attribute
---------
OUTPUT:
---------
// the data rows, sorted.
// the position in the ring where the first part ends
// timestamp of the first row in the dataset timestampFirstRow :=
timestamp_row$_0$
// define the timestamp of the concentric ring origin (201, Fig. 2)
```

-continued

```
// = timestampFirstRow where second, minute, hour = 0
timestamp concentric ring start := timestampFirstRow and
                set second to 0
                set minute to 0
                set hour to 0
// identify the end-timestamp of the current period (204, Fig. 2)
// = start-timestamp of the next period
// all data rows with a timestamp greater than this start-timestamp to be
changed
in order to visualize them in one ring (206, Fig. 2)
timestampStartNextDateRange :=
                            timestamp concentric ring start +
dateRangeOnePeriod
// save the number of date changes in the following variable
numberOfDateChanges := 0
// look through all datarows and change the timestamp, if appropriate
for each data row i do
    if (timestamp_row_i >= timestampStartNextDateRange)
        set timestamp := timestamp concentric ring start +
            (timestamp_row_i – timestampStartNextDateRange)
        // increment the number of date ranges
        numberOfDateChanges++
    endif
endfor
// sorting
sort all data rows according to their (new) timestamp
// return the new sorted data rows and the number of data rows whose
// date has been changed (= identification of the cells where gap is to be
drawn)
return data rows
return noOfDateChanges
```

Given the data structure provided in the table above and the code described above, the display system can rearrange the data to have a new placement in the concentric circles such that the data associated with time stamps that belongs to the subsequent time unit of August $21^{st}$ from 0:00 a.m. to 5:59 a.m. will be displayed before the start time (6:00 a.m. on August $20^{th}$) of the original time unit. In this example, the following data structure results in response to applying the code as described above:

| Attribute 1 | ... | Attribute N | Time Stamp (used for positioning) | Display Time Stamp (used for drawing) |
|---|---|---|---|---|
| 62 | ... | 52 | 8/20/2012 00:00 | *8/21/2012 00:00* |
| 61 | ... | 51 | 8/20/2012 00:01 | *8/21/2012 00:01* |
| 64 | ... | 56 | 8/20/2012 00:02 | *8/21/2012 00:02* |
| ... | ... | ... | ... | ... |
| 64 | ... | 61 | 8/20/2012 05:58 | *8/21/2012 05:58* |
| 61 | ... | 61 | 8/20/2012 05:59 | *8/21/2012 05:59* |
| 61 | ... | 60 | 8/20/2012 06:00 | 8/20/2012 06:00 |
| 62 | ... | 61 | 8/20/2012 06:01 | 8/20/2012 06:01 |
| 62 | ... | 59 | 8/20/2012 06:02 | 8/20/2012 06:02 |
| 62 | ... | 72 | 8/20/2012 06:03 | 8/20/2012 06:03 |
| ... | ... | ... | ... | ... |
| 63 | ... | 60 | 8/20/2012 23:58 | 8/20/2012 23:58 |
| 61 | ... | 60 | 8/20/2012 23:59 | 8/20/2012 23:59 |

The time stamps in italics in the display time stamp column are moved to the front of the data set in response to applying the above described code. As a result, the data associated with these display time stamps will be displayed in the concentric ring along with the other data that belongs to the original time unit in the pre-nonorigin starting section (206). Thus, the concentric rings' space will be used efficiently. A gap (212) made of the background color will be displayed in the concentric rings between the reused cells and the nonorigin starting time (210). As a result, the background color gap (212) will visually indicate to the user where the start time of the measurements is located.

Figure 3:
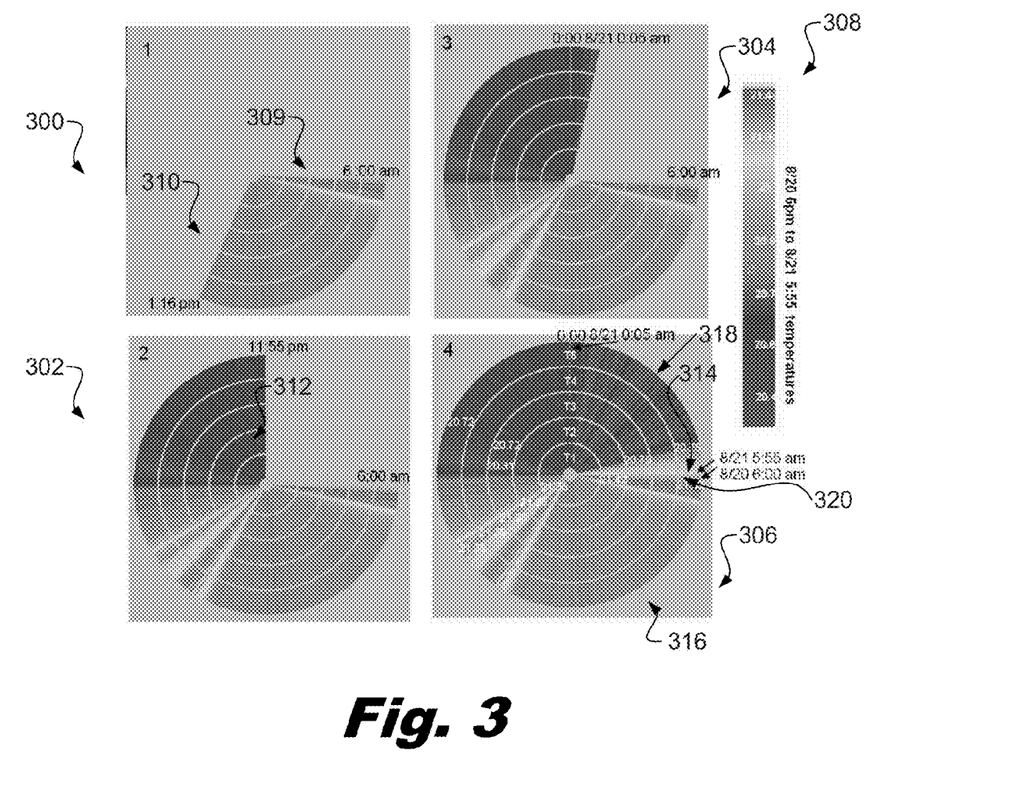
FIG. 3 is a diagram of an example of animating a creation of concentric rings according to the principles described herein.

FIG. 3 is a diagram of an example of animating a creation of concentric rings according to the principles described herein. In this example, a series of time sequenced frames (300, 302, 304, 306) of the interactive graph (308) are depicted in a display. Each of the concentric rings (T1, T2, T3, T4, T5) represents a sensor and the metric represented by the cell's color is a temperature recorded by the sensor.

In the first frame (300), the start time (309) is 6:00 a.m. The first frame (300) was paused at 1:16 p.m., so the first frame's end time (310) appears to be 1:16 p.m. However, the sensors are continuing to record the temperatures, so the first frame's end time (310) is not the last measurement taken.

In the second frame (302), the measurements are resumed such that the measurements of the first frame (300) as well as the measurements taken up to 11:55 p.m. are depicted. In this example, 11:55 p.m. appears to be the second frame's end time (312), but the measurements are still being recorded by the sensors.

The third frame (304) depicts all of the measurements that are recorded in the first and second frames (300, 302) as well as the measurements recorded between 11:55 p.m. on August $20^{th}$ and 0:05 a.m. on August $21^{st}$. Thus, these measurements span time periods from the original time unit (August $20^{th}$) to the subsequent time unit (August $21^{st}$).

The fourth frame (306) depicts all of the measurements from the earlier frames (300, 302, 304) as well as the measurements up to 5:55 am on August $21^{st}$. The fourth frame's end time (314) is 5:55 a.m. on August $21^{st}$, however, the measurements are continuing to be recorded. The additional measurements taken after 5:55 a.m. on August $21^{st}$ can be depicted in different concentric rings. The cells that represent time periods between 6:00 a.m. and 11:59 p.m. of August $20^{th}$ belong to the original time unit and post-nonorigin starting section (316) of the concentric rings where their measurements are taken after the measurements are started to be taken. The cells that represent time periods between 0:00 a.m. and 5:59 a.m. on August $20^{th}$ are also part of the original time unit and belong to the pre-nonorigin starting section (318) of the concentric rings where the cells have no recorded information. The principles described herein allow time periods of a subsequent time unit (August $21^{st}$) that corresponds to the time periods of the pre-nonorigin starting section to be reused to display colors for metrics of the subsequent time unit.

A gap (320) formed between the nonorigin start time (309) and the end time (314) in the fourth frame (306) allows the user to visual understand where the location of the start time (309) is located. In some examples, the gap (320) is small because most of the cells in the pre-nonorigin starting section (318) are reused. However, in some examples, the fewer cells in the pre-nonorigin starting section (318) are reused and, thus, the gap (320) may be larger. For example, if the measurements continued to just 3:00 a.m. on August $21^{st}$, the gap (320) would be larger than depicted in the example of FIG. 3, where the measurements were taken at least up until 5:55 a.m. on August $21^{st}$.

The frames of the animation in the example of FIG. 3 may be part of an original, real time creation of the concentric rings. In such an example, a user may view the concentric rings as the measurements are recorded to understand a real time condition. In other examples, the animation is a replay of the creation of the concentric rings. In such a manner, the user may view the creation of the concentric rings as desired. The user may have an option to cause the replay to recreate the concentric rings at a different speed than the concentric rings were originally created. For example, instead of recreating the concentric rings over a twenty four hour period, the concentric rings may be created over a five minute period. The interactive graph (308) may give the user an option to select specific speeds to recreate the concentric rings. In other examples, the interactive graph (308) gives the user an option to input the speed with which the user desires to recreate the concentric rings.

In the example of FIG. 3, each of the concentric rings is grown at the same rate in parallel. For example, each of the cells that represent the same time period is generated at the same time along the order of the sequential time periods. The cells on the outer most ring (T5) are larger than the other cells representing the corresponding time periods in the other concentric rings, for example, the cells in the inner most concentric ring (T1). Despite the difference in size, each of the cells is generated simultaneously such that each of the concentric rings (T1, T2, T3, T4, T5) is completed at the same time in parallel.

While this example has been described with reference to specific ways of creating original, real time concentric rings or recreating the concentric rings, any appropriate mechanism for creating the original concentric rings or recreating the concentric rings may be used in accordance with the principles described herein. Further, any appropriate start times or end times may be used in accordance with the principles described herein. Also, the cells of the concentric rings may represent sequential time periods that belong to the same day, to different days, to different weeks, or to different units of time.

Figure 4:
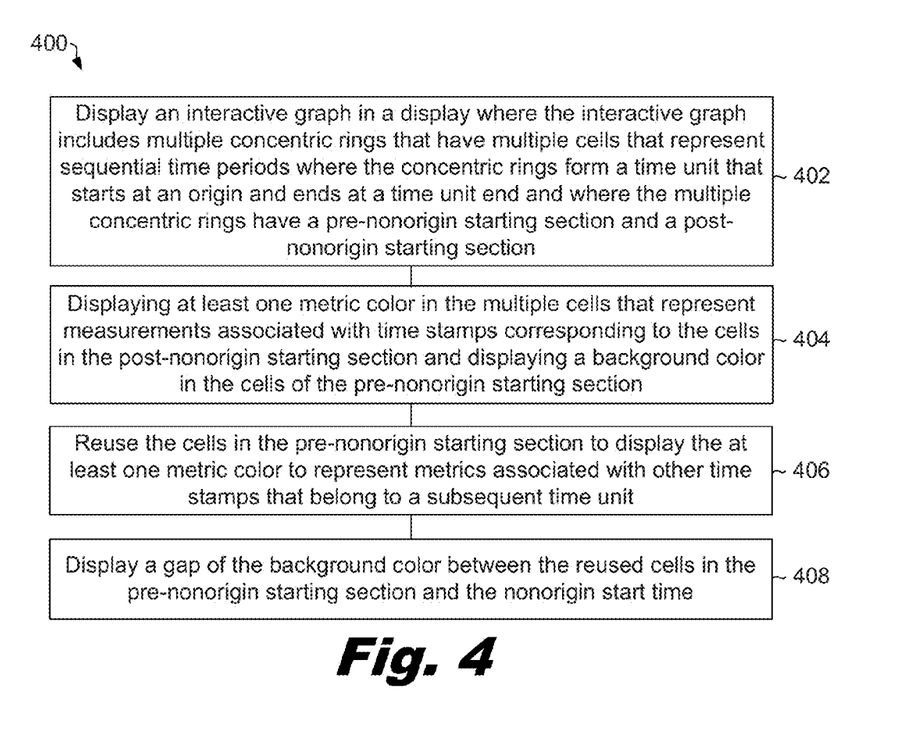
FIG. 4 is a diagram of an example of a method of visual analytics using concentric rings with a visual start time mechanism according to the principles described herein.

FIG. 4 is a diagram of an example of a method (400) of visual analytics using concentric rings with a visual start time mechanism according to the principles described herein. In this example, the method (400) includes displaying (402) an interactive graph in a display where the interactive graph includes multiple concentric rings that have multiple cells that represent sequential time periods where the concentric rings form a time unit starting at an origin and ends at a time unit end and where the multiple concentric rings has a pre-nonorigin starting section and a post-nonorigin starting section, displaying (404) at least one metric color in the multiple cells that represent measurements associated with time stamps corresponding to the cells in the post-nonorigin starting section and displaying a background color in the cells of the pre-nonorigin starting section, reusing (406) the cells in the pre-nonorigin starting section to display the at least one metric color to represent metrics associated with other time stamps that belong to a subsequent time unit, and displaying (408) a gap of the background color between the reused cells in the pre-nonorigin starting section and the nonorigin start time.

The interactive graph may display multiple attributes using the concentric rings. Each of the multiple concentric rings represents a unit of time, a sensor, a variable, other attributes, or combinations thereof at the same time. The cells of the multiple concentric rings can be aligned such that the sequential time periods of a first concentric ring are aligned with the sequential times periods of a second concentric ring, and so forth.

The background color may be any appropriate color that is the same color as the background of the interactive graph. For example, the background color may be black, white, gray, blue, green, red, another color, or combinations thereof. The gap may be formed to draw the user's attention to a discontinuity in the concentric rings. The start time and/or the end time may be labeled to further clarify that the gap represents the start time and/or end time.

The method may also include displaying an animation of creating the concentric ring in the interactive graph. The animation may include displaying data associated with the cells as the data is obtained in real time. Thus, the animation depicts the formation of the concentric rings in real time. In other examples, the animation includes replaying the creation of the concentric ring.

Detailed recorded data associated with the cells may be displayed in response to user input. The user may select one of the cells to obtain more details about the metrics or other measurements associated with the cell's time period. Any appropriate mechanism for selecting a cell may be used in accordance with the principles described herein. For example, the user may select the desired cell through a cursor input, a touch screen input, a keyboard input, a voice input, a motion detectable gesture input, another type of input, or combinations thereof. The detailed data of the cells may be display in a pop-up window, to the side of concentric rings, another location in the interactive graph, or combinations thereof. The detailed data may include specific measurements, such as a specific recorded temperature metric, power consumption metric, another metric, or combinations thereof. In some examples, the detailed data also includes the specific measurement of the time period represented by the cell. Further, the detailed data may include additional information about metrics not represented with the color of the cell. For example, if the metric depicted in the cell is a temperature metric, the detailed data may include the time period represented by the cell, the specific temperature measurement, as well as bandwidth measurements, data error measurements, failure measurements, other measurements, or combinations thereof.

Figure 5:
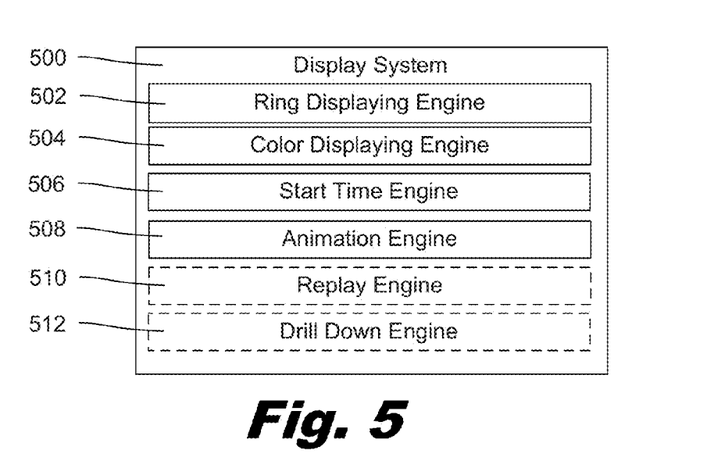
FIG. 5 is a diagram of an example of a display system according to the principles described herein.

FIG. 5 is a diagram of an example of a display system (500) according to the principles described herein. The display system (500) includes a ring displaying engine (502), a color displaying engine (504), a start time engine (506), and an animation engine (508). In this example, the display system (500) also includes a replay engine (510) and a drill down engine (512). The engines (502, 504, 506, 508, 510, 512) refer to a combination of hardware and program instructions to perform a designated function. Each of the engines (502, 504, 506, 508, 510, 512) may include a processor and memory. The program instructions are stored in the memory and cause the processor to execute the designated function of the engine.

The ring displaying engine (502) displays the concentric rings and the color displaying engine (504) displays the color assigned to the cells of the concentric rings. The start time engine (506) causes the background color to be displayed in the cells that belong to the pre-nonorigin starting section. In some examples, the start time engine (506) also causes the cells that belong to the post-nonorigin starting section to also display the background color in response to such cells missing metric information.

The animation engine (508) causes the concentric rings to be displayed in real time as the data to be presented in the concentric rings is obtained. The sensors may send the data to the display system (500) as data is gathered, or the display system (500) may request the data from the sensors on either a demand or periodic basis. In some examples, the animation engine (508) causes each cell to display its appropriate color as the time period represented by that cell passes. In other examples, the animation engine (508) causes multiple cells to display their colors at once.

The replay engine (510) causes the concentric rings and their associated colors to be recreated. The replay engine (510) may cause the recreation to occur in a time sequence patterned after the order of the sequential time periods. The replay engine (510) may be created in response to user input.

The drill down engine (512) causes the interactive graph to display detailed data associated with a time period of a cell.

The detailed information may be displayed in response to user input. The detailed information may be specific metric measurements, identification of the time period associated with the cell, metrics associated with the time period that are not associated with the color of the cell, other information, or combinations thereof.

Figure 6:
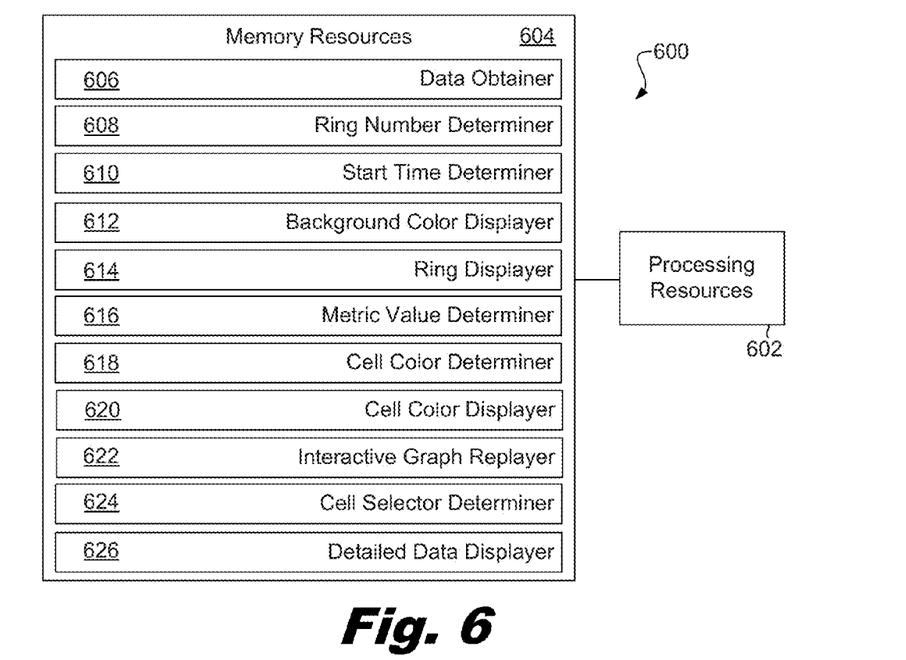
FIG. 6 is a diagram of an example of a display system according to the principles described herein.

FIG. 6 is a diagram of an example of a display system (600) according to the principles described herein. In this example, the display system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the display system (600). The programmed instructions shown stored in the memory resources (604) include a data obtainer (606), a ring number determiner (608), a start time determiner (610), a background color displayer (612), a ring displayer (614), a metric value determiner (616), a cell color determiner (618), a cell color displayer (620), an interactive graph replayer (622), a cell selector determiner (624), and a detailed data displayer (626).

The memory resources (604) include a computer readable storage medium that contains computer readable program code to cause tasks to be executed by the processing resources (602). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, other types of memory, or combinations thereof.

The data obtainer (606) represents programmed instructions that, when executed, cause the processing resources (602) to obtain data from sensors that are recording information about a metric. The ring number determiner (608) represents programmed instructions that, when executed, cause the processing resources (602) to determine the number of concentric rings to display. For example, if the concentric rings represent sensors, the ring number determiner (608) determines how many sensors are to be represented in the interactive graph. The start time determiner (610) represents programmed instructions that, when executed, cause the processing resources (602) to determine the start time of when the metrics are recorded. The background color displayer (612) represents programmed instructions that, when executed, cause the processing resources (602) to display the background color in the cells that are part of the pre-nonorigin starting section. Likewise, the background color displayer (612) also can cause cells that belong to the post-nonorigin starting section to also display the background color when such cells are missing metric data. The ring displayer (614) represents programmed instructions that, when executed, cause the processing resources (602) to display the rings based on input from the ring number determiner (608), start time determiner (610), and background color determiner (612).

The metric value determiner (616) represents programmed instructions that, when executed, cause the processing resources (602) to determine the metric values to display in the cells of the concentric rings based on the data obtained with the data obtainer (606). The cell color determiner (618) represents programmed instructions that, when executed, cause the processing resources (602) to determine the cell color for each cell based on the metric values determined by the metric value determiner (616). The cell color displayer (620) represents programmed instructions that, when executed, cause the processing resources (602) to display the color determined by the cell color determiner (618) in the appropriate cells.

The interactive graph replayer (622) represents programmed instructions that, when executed, cause the processing resources (602) to replay the creation of the concentric rings cell by cell or multiple cells at a time along to the cell's time sequence. The cell selector determiner (624) represents programmed instructions that, when executed, cause the processing resources (602) to determine when a user has selected a cell for additional information associated with the cell's time period. The detailed data displayer (626) represents programmed instructions that, when executed, cause the processing resources (602) to display the detailed data in the interactive graph in response to the cell's selection.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries and may be accessed from a remote location over a network connection while the programmed instructions are located locally. Thus, the display system (600) may be implemented on a user device, on a server, on a collection of servers, or combinations thereof.

The display system (600) of FIG. 6 may be part of a general purpose computer. However, in alternative examples, the display system (600) is part of an application specific integrated circuit.

Figure 7:
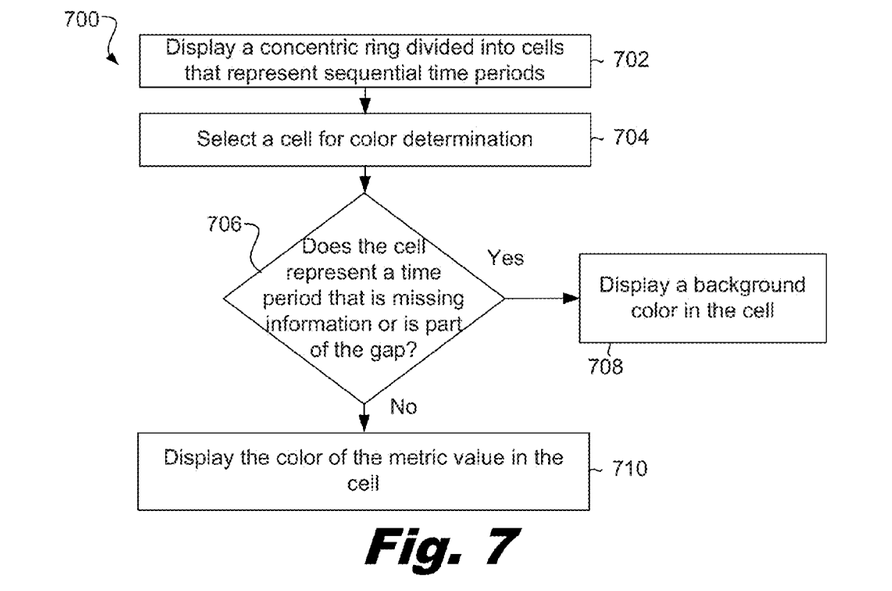
FIG. 7 is a diagram of an example of a flowchart of a process of visual analytics using concentric rings with a visual start time mechanism according to the principles described herein.

FIG. 7 is a diagram of an example of a flowchart (700) of a process of visual analytics using concentric rings with a visual start time mechanism according to the principles described herein. In this example, the process includes displaying (702) a concentric ring divided into cells that represent sequential time periods and selecting (704) a cell for color determination. The process includes determining (706) whether the cell represents a time period that is missing information or is part of the gap. If the cell represents a time period that is missing information or is part of the gap, the process includes displaying (708) a background color in that cell. On the other hand, if the cell has metric information, the process includes displaying (710) the color of the metric value in that cell.

The principles described herein provide a mechanism for visualizing time-based correlations among multiple multivariate time series. Each time series data is placed in a user defined period (twenty four hours, a week, a month, etc.) with an arbitrary time origin. Furthermore, using background color gaps allow users to intuitively identify the beginning times and ending times to discover their periodic patterns and anomalies.

While the examples above have been described with reference to specific applications associated with data centers and temperatures, the principles described herein may be used in any appropriate application according to the principles described herein. For example, the principles described herein may be used in weather applications, scientific applications, computer applications, medical applications, vehicle applications, historical applications, educational applications, government applications, other applications, or combinations thereof. Further, while the examples above have been described with reference to specific origins, nonorigin starting times, time unit end times, and other times, any appropriate times for the origin, nonorigin starting time, time unit end time, and other times may be used in accordance with the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of visual analytics using multivariate concentric rings with a visual start time mechanism, comprising:
    displaying an interactive graph in a display, the interactive graph comprising multiple concentric rings that have multiple cells that represent sequential time periods, the multiple concentric rings forming a time unit that begins at an origin time and concludes at an end time;
    the multiple concentric rings also comprise a nonorigin start time to indicate a start of measurement, a pre-nonorigin start section including cells of a time period between the origin time and the nonorigin start time, and a post-nonorigin start section including cells of a time period between the nonorigin start time and the end time;
    displaying at least one metric color in the multiple cells that represent measurements associated with time stamps corresponding to the cells in the post-nonorigin start section and displaying a background color in the cells of the pre-nonorigin start section;
    reusing the cells in the pre-nonorigin start section to display the at least one metric color to represent metrics associated with other time stamps that belong to a subsequent time unit; and
    displaying a gap of the background color between the reused cells in the pre-nonorigin start section and the nonorigin start time.

2. The method of claim 1, wherein displaying the interactive graph in the display includes creating the multiple concentric rings in parallel such that the multiple concentric rings are created at a consistent rate along an order of the sequential time periods of the cells.

3. The method of claim 1, wherein the cells of the multiple concentric rings are aligned such that the sequential time periods of a first concentric ring are aligned with the sequential time periods of a second concentric ring.

4. The method of claim 1, further comprising displaying an animation of creating the concentric rings in the interactive graph.

5. The method of claim 4, wherein displaying the animation of creating the concentric rings in the interactive graph includes displaying data associated with the cells as the data is obtained in real time.

6. The method of claim 4, wherein displaying the animation of creating the concentric rings in the interactive graph includes replaying a creation of the concentric ring.

7. The method of claim 1, further comprising displaying detailed recorded data associated with a selected cell in response to user input.

8. The method of claim 1, wherein each of the multiple concentric rings represents a sensor and the metric is a sensor metric.

9. A system of visual analytics using multivariate concentric rings with a visual start time mechanism, comprising:
    a processor;
    a ring displaying engine to display multiple concentric rings divided into cells that represent sequential time periods in an original time unit in an interactive graph in a display, wherein the original time unit starts at an origin time and concludes at an end time;
    a start time engine to display a nonorigin start time with a gap of a background color of the interactive graph to indicate a start of measurement;
    a color displaying engine to display at least one color in the cells of a post-nonorigin start section of the concentric rings to represent a value of a metric and to display the background color in a pre-nonorigin start section of the concentric rings, wherein the pre-nonorigin start section includes cells of a time period between the origin time and the nonorigin start time and the post-nonorigin start section includes cells of a time period between the nonorigin start time and the end time;
    the color displaying engine to further reuse the cells in the pre-nonorigin start section to display the at least one color to represent metrics measured in a subsequent time unit; and
    an animation engine to play a creation of the multiple concentric rings in real time as data associated with the cells is obtained.

10. The system of claim 9, further comprising a replay engine to replay the creation of the multiple concentric rings in the interactive graph.

11. The system of claim 9, further comprising a drill down engine to display detailed recorded data associated with a selected cell in response to user input.

12. The system of claim 9, wherein each of the multiple concentric rings represents a sensor and the metric is a sensor metric.

13. A computer program product for visual analytics using multivariate concentric rings with a visual start time mechanism, comprising:
    a non-transitory computer readable storage medium, the non-transitory computer readable storage medium comprising computer readable program code embodied therewith, the computer readable program code comprising program instructions that, when executed, causes a processor to:
    display multiple concentric rings divided into cells that represent sequential time periods in an original time unit in an interactive graph, wherein the original time unit starts at an origin time and concludes at an end time;
    display a nonorigin start time to indicate a start of measurement with a background color of the interactive graph in a pre-nonorigin start section, which includes cells of a time period between the origin time and the nonorigin start time;
    display at least one color to represent a value of a metric in a post-nonorigin start section, which includes cells of a time period between the nonorigin start time and the end time;

reuse the cells in the pre-nonorigin start section by displaying the at least one color to represent metrics of a subsequent time unit;

play a creation of the multiple concentric rings in real time as data associated with the cells is obtained; and replay the creation of the multiple concentric rings in the interactive graph.

14. The computer program product of claim 13, further comprising computer readable program code comprising program instructions that, when executed, cause said processor to reuse the cells in the pre-nonorigin start section until a point such that a gap of the background color remains between the reused cells of the nonorigin start section and the nonorigin start time.

15. The computer program product of claim 13, further comprising computer readable program code comprising program instructions that, when executed, cause said processor to display detailed recorded data associated with a selected cell in response to user input.

* * * * *